United States Patent
Sniezewski et al.

(10) Patent No.: US 10,899,673 B2
(45) Date of Patent: Jan. 26, 2021

(54) METHOD OF PROTECTING A COMPOSITE MATERIAL PART AGAINST OXIDATION

(71) Applicant: SAFRAN LANDING SYSTEMS, Velizy-Villacoublay (FR)

(72) Inventors: Julien Sniezewski, Les Haies (FR); Vincent Caro, Neuilly-sur-Seine (FR); Nathalie Nicolaus, Lyons (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 0 days.

(21) Appl. No.: 16/280,707

(22) Filed: Feb. 20, 2019

(65) Prior Publication Data

US 2019/0264039 A1    Aug. 29, 2019

(30) Foreign Application Priority Data

Feb. 23, 2018    (FR) ........................... 1851604

(51) Int. Cl.
   *C04B 41/00*    (2006.01)
   *C04B 41/89*    (2006.01)
   (Continued)

(52) U.S. Cl.
   CPC .......... *C04B 41/009* (2013.01); *C03C 8/20* (2013.01); *C04B 41/52* (2013.01); *C04B 41/89* (2013.01);
   (Continued)

(58) Field of Classification Search
   CPC .. C09D 5/10; C09D 5/002; C09D 1/00; C04B 41/52; C04B 41/89; C04B 41/009;
   (Continued)

(56) References Cited

U.S. PATENT DOCUMENTS 5,853,821 A * 12/1998 Balhadere ............. C04B 41/009
                                                427/601
2004/0213906 A1 * 10/2004 Mazany .................. C04B 35/83
                                                427/249.1
(Continued)

FOREIGN PATENT DOCUMENTS

EP    2 930 162 A1    10/2015
FR    2 889 186 A1    2/2007

OTHER PUBLICATIONS

Search Report as issued in French Patent Application No. 1851604, dated Oct. 11, 2018.

*Primary Examiner* — William P Fletcher, III
(74) *Attorney, Agent, or Firm* — Pillsbury Winthrop Shaw Pittman LLP

(57) ABSTRACT

A method of protecting a carbon-containing composite material part against oxidation, includes applying a first coating composition in the form of an aqueous suspension on an outside surface of the part, the first coating composition including a metallic phosphate; a powder of an ingredient comprising titanium; and a powder of $B_4C$; subjecting the applied first coating composition to heat treatment in order to obtain a first coating on the outside surface of the part; applying a second coating composition on the first coating composition, the second coating composition including an aqueous suspension of colloidal silica; a powder of borosilicate glass; and a powder of $TiB_2$; and subjecting the applied second coating composition to second heat treatment in order to obtain a second coating on the first coating.

10 Claims, 2 Drawing Sheets

(51) Int. Cl.
  *C04B 41/52* (2006.01)
  *C04B 111/00* (2006.01)
  *C04B 41/50* (2006.01)
  *C03C 8/20* (2006.01)
  *C09D 1/00* (2006.01)
  *C09D 5/00* (2006.01)
  *C09D 5/10* (2006.01)
  *F16D 69/02* (2006.01)
  *F16D 65/12* (2006.01)
  *B05D 1/02* (2006.01)
  *B05D 1/28* (2006.01)
  *B05D 7/00* (2006.01)
  *B05D 3/02* (2006.01)

(52) U.S. Cl.
  CPC .............. *C09D 1/00* (2013.01); *C09D 5/002* (2013.01); *C09D 5/10* (2013.01); *F16D 69/023* (2013.01); *B05D 1/02* (2013.01); *B05D 1/28* (2013.01); *B05D 3/0254* (2013.01); *B05D 7/546* (2013.01); *B05D 2203/30* (2013.01); *C03C 2209/00* (2013.01); *C04B 41/5035* (2013.01); *C04B 41/5048* (2013.01); *C04B 41/5058* (2013.01); *C04B 2111/00362* (2013.01); *F16D 65/126* (2013.01); *F16D 65/127* (2013.01); *F16D 2200/0047* (2013.01); *F16D 2250/0046* (2013.01)

(58) Field of Classification Search
  CPC ....... C04B 2111/00362; C04B 41/5035; C04B 41/5048; C04B 41/5058; F16D 69/023; F16D 69/026; F16D 2250/0046; F16D 2200/0034; F16D 2200/003; F16D 65/127; F16D 65/126; C03C 8/20; C03C 2209/00; B05D 3/0254; B05D 2203/30; B05D 7/546; B05D 1/28; B05D 1/02; C09K 15/02
  See application file for complete search history.

(56) References Cited

U.S. PATENT DOCUMENTS

| | | | |
|---|---|---|---|
| 2007/0026153 A1* | 2/2007 | Nicolaus | C04B 35/632 427/372.2 |
| 2007/0154712 A1* | 7/2007 | Mazany | C04B 41/009 428/408 |
| 2007/0199626 A1* | 8/2007 | Diss | C04B 41/009 148/247 |
| 2008/0311301 A1* | 12/2008 | Diss | C04B 41/009 427/314 |
| 2014/0227511 A1* | 8/2014 | Mazany | C09D 5/002 428/323 |
| 2015/0291805 A1 | 10/2015 | Nicolaus et al. | |

* cited by examiner

METHOD OF PROTECTING A COMPOSITE MATERIAL PART AGAINST OXIDATION

CROSS-REFERENCE TO RELATED APPLICATIONS

This application claims priority to French Patent Application No. 1851604, filed Feb. 23, 2018, the entire content of which is incorporated herein by reference in its entirety.

FIELD

The invention relates to providing protection against oxidation for parts made of carbon containing composite material, i.e. out of material comprising fiber reinforcement densified by a matrix and in which the fiber reinforcement and/or the matrix and/or an interphase coating between the fibers of the reinforcement and the matrix is/are made of carbon. A particular field of application of the invention is providing protection against oxidation for parts made of carbon/carbon (C/C) composite material, in particular C/C composite brake disks, and more specifically airplane brake disks.

BACKGROUND

In an oxidizing medium, the ability of carbon-containing composite material parts to conserve good mechanical properties at high temperatures depends on the presence of effective protection against the carbon oxidizing. Specifically, once the composite material has been prepared, it usually presents residual internal pores that give the ambient medium access to the core of the material.

In order to provide such protection against oxidation, it is known to make use of internal systems based on metallic phosphate(s) that are put into place by being impregnated in the residual pores of composite material parts by means of a composition in the form of an aqueous solution. In order to extend the range of protection to higher temperatures, it is possible to use external coatings.

By way of example, Document US 2007/0026153 describes a method for protecting carbon-containing composite material parts, in particular brake disks made of C/C composite material. In a first step of the method, internal protection is put into place by impregnating with an aqueous solution of metallic phosphate, such as monoaluminum phosphate, together with heat treatment at about 700° C. under nitrogen ($N_2$). Thereafter, an external coating is formed by applying a liquid composition comprising an aqueous medium containing colloidal silica $SiO_2$, a powder of borosilicate glass of the "Pyrex®" type, and powder of titanium diboride $TiB_2$. In service in an oxidizing medium, $TiB_2$ oxidizes and forms $B_2O_3$, thereby regenerating the $B_2O_3$ and conserving a borosilicate glass phase that has healing properties by passing to a pasty state as from 600° C.

Nevertheless, the lifetime of the protection is relatively limited given repeated exposure to a wet environment because of the disappearance of $B_2O_3$ and the consumption of $TiB_2$. It would also be desirable to improve the protection imparted by the solution of US 2007/0026153 when stressed at very high temperature.

SUMMARY

In a first aspect, the invention provides a method of protecting a carbon-containing composite material part against oxidation, the method comprising at least:

applying a first coating composition in the form of an aqueous suspension on an outside surface of the part, the first coating composition comprising:
  a metallic phosphate;
  a powder of an ingredient comprising titanium; and
  a powder of $B_4C$;
subjecting the applied first coating composition to heat treatment in order to obtain a first coating on the outside surface of the part;
applying a second coating composition on the first coating composition, the second coating composition comprising:
  an aqueous suspension of colloidal silica;
  a powder of borosilicate glass; and
  a powder of $TiB_2$; and
subjecting the applied second coating composition to second heat treatment in order to obtain a second coating on the first coating.

In order to improve the performance of the composition disclosed in Document US 2007/0026153, a first solution tested by the inventors was to increase in thickness the coating of that document. For that purpose, a second layer of the same composition was applied. That increase in thickness gave rise to a reduction of adhesion for the resulting two-layer coating. That solution therefore does not enable anti-oxidation performance to be improved.

The invention lies in the fact of using the above-described first coating composition in order to provide a first coating constituting a bonding underlayer for the composition disclosed in Document US 2007/0026153, which corresponds to the above-described second coating composition.

By choosing specifically to combine the first coating composition with the second coating composition in the order specified in the invention, a coating is obtained that is of increased thickness, that presents good adhesion, and that confers excellent resistance to oxidation in a wet medium and at very high temperature. The resulting anti-oxidation performance is in particular significantly improved compared with the performance obtained using the solution of US 2007/0026153 or compared with other coatings of increased thickness.

In an implementation, the ingredient comprising titanium is titanium metal.

In an implementation, the metallic phosphate is an aluminum phosphate.

In an implementation, the first coating composition prior to application comprises:
  the metallic phosphate at a content by weight lying in the range 27% to 36%;
  the powder of the ingredient comprising titanium at a content by weight lying in the range 8% to 18%; and
  the powder of $B_4C$ at a content by weight lying in the range 11.5% to 21%.

In an implementation, a first heat treatment temperature lying in the range 330° C. to 740° C. is imposed during the first heat treatment.

In an implementation, the aqueous suspension of colloidal silica is basic.

By using a basic suspension, it is beneficially possible to improve still further the adhesion of the second coating on the first coating based on metallic phosphate, which is of an acidic nature.

In an implementation, the second coating composition, prior to application, comprises:
- the aqueous suspension of colloidal silica at a content by weight lying in the range 25% to 50%, with a content by weight of silica in the suspension lying in the range 20% to 50%;
- the powder of borosilicate glass at a content by weight lying in the range 5% to 20%; and
- the powder of $TiB_2$ at a content by weight lying in the range 30% to 60%; and
- the balance, if any, being water.

In an implementation, a second heat treatment temperature lying in the range 600° C. to 800° C. is imposed during the second heat treatment. The second treatment temperature may for example lie in the range 650° C. to 740° C.

In an implementation, at least one internal protection layer is formed prior to applying the first coating composition by impregnating at least a portion of the composite material part with an impregnation composition comprising a metallic phosphate.

In an implementation, the part is a friction part. In particular, the friction part may be made of carbon/carbon composite material.

BRIEF DESCRIPTION OF THE DRAWINGS

Other characteristics and benefits of the invention appear from the following description given in non-limiting manner and with reference to the accompanying drawings, in which.

DETAILED DESCRIPTION

In the description below, consideration is given to protecting C/C composite material parts against oxidation, and more particularly to protecting brake disks, such as aviation brake disks. More generally, the invention is applicable to providing any part made of carbon-containing composite material against oxidation.

Figure 1:
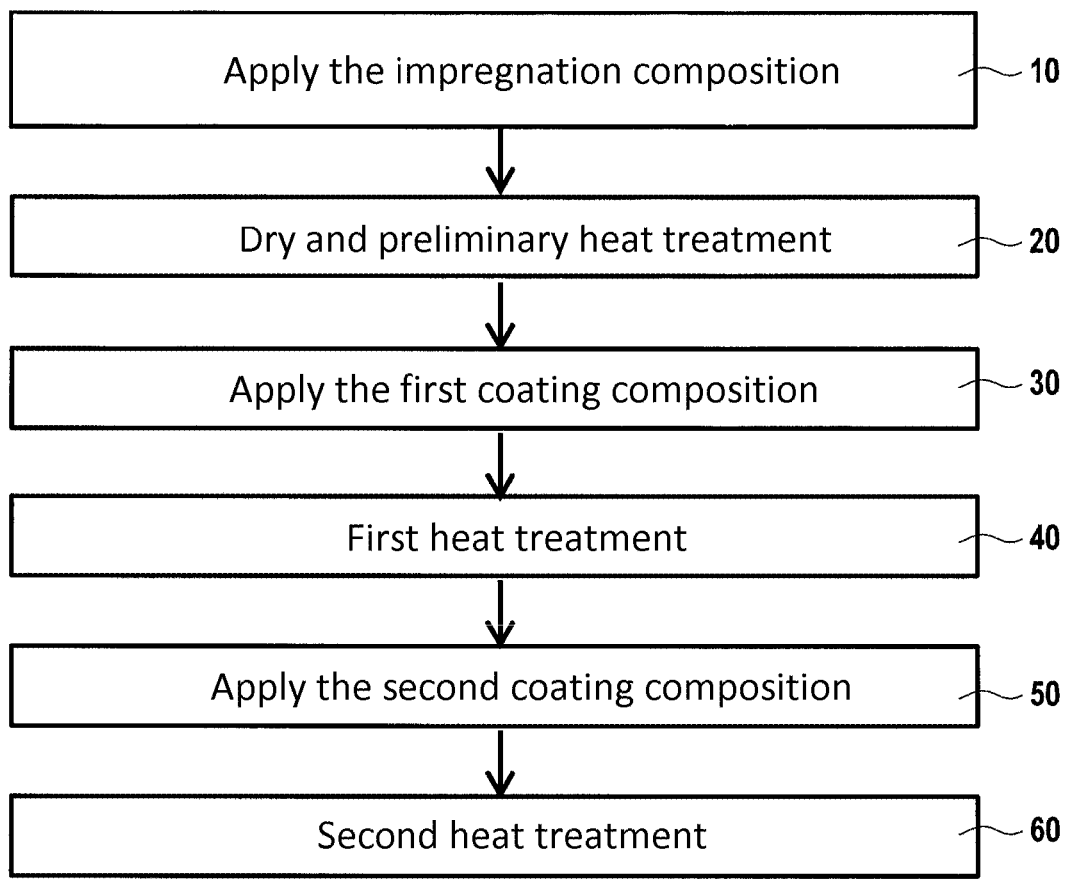
FIG. 1 is a flow chart showing the various successive steps of an example method of the invention.
Figure 2:
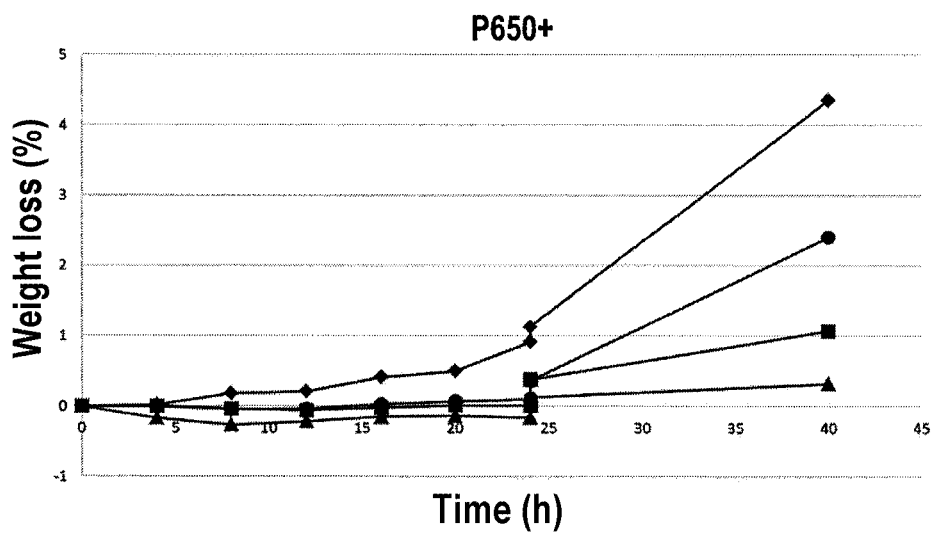
FIGS. 2 to 5 are curves plotting variation in weight as a function of durations of oxidation for samples made of C/C composite material and provided with different protections against oxidation.
Figure 3:
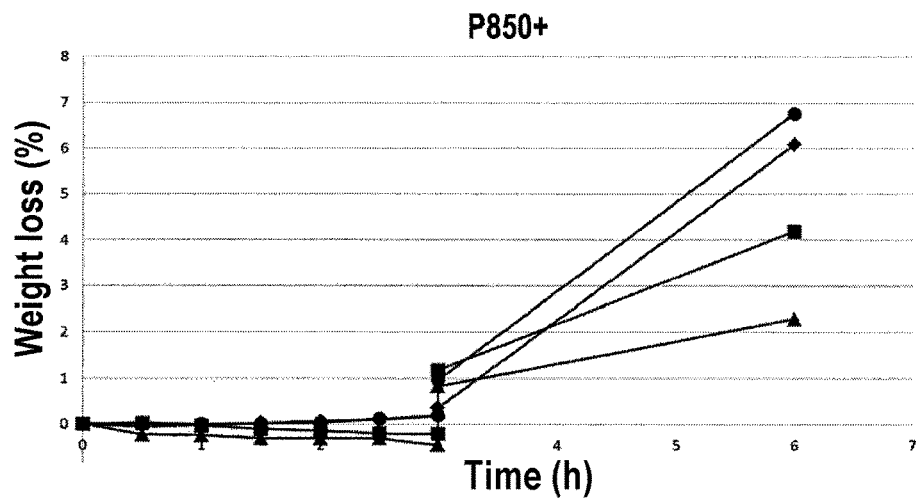
Figure 4:
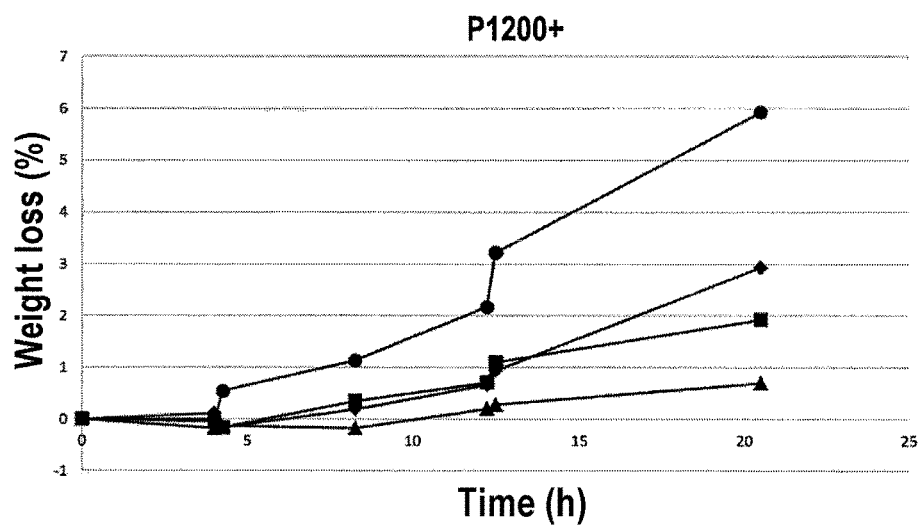
Figure 5:
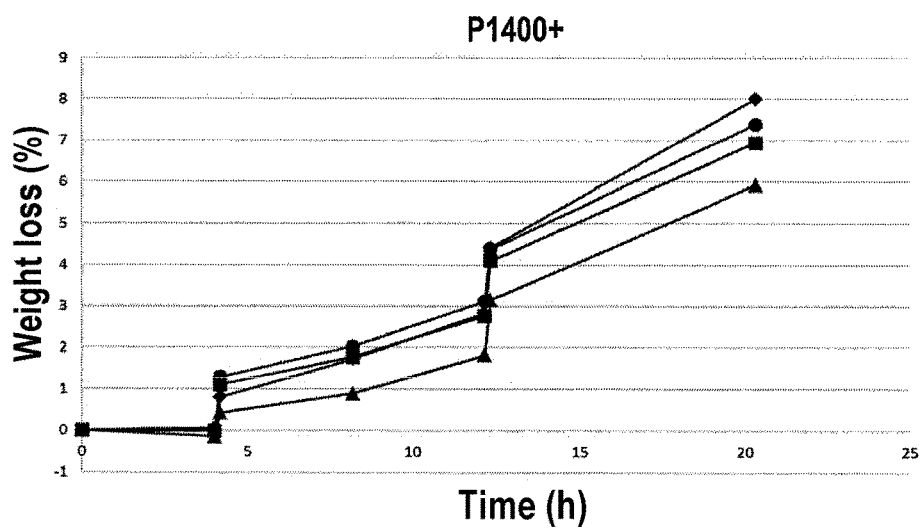

In a particular implementation of the method of FIG. 1, a first stage consists in forming internal protection within the accessible pores of a part or of a portion of a part that is to be protected, the internal protection comprising at least one metallic phosphate suitable in particular for providing protection against the carbon oxidizing.

It is possible to proceed as described in Document U.S. Pat. No. 5,853,821. A first step consists in depositing a wetting agent within the accessible pores of the composite material. For this purpose, use is made of an aqueous solution of a wetting agent, e.g. such as the substance sold by the German supplier Sasol GmbH under the name "Marlophen NP9". After the composite material has been impregnated with this solution of wetting agent and has been dried, an impregnation composition in the form of an aqueous solution containing a metallic phosphate is applied over the entire outside surface of the part, or else selectively over a portion of the outside surface of the part, e.g. by means of a brush or by spraying (i.e. with a spray gun) (step 10). By way of example, use is made of an aqueous solution of aluminum hydrogen phosphate $Al(H_2PO_4)_3$. The metallic phosphate may also be a zinc phosphate, e.g. having the following chemical formula: $Zn_3(PO_4)_2 \cdot xH_2O$, a manganese phosphate, e.g. having the following chemical formula: $Mn(H_2PO_4)_2 \cdot 2H_2O$, or indeed a magnesium phosphate, e.g. having the following chemical formula: $Mg_3(PO_4)_2 \cdot 8H_2O$.

The wetting agent present on the surface of the accessible pores in the composite material facilitates penetration of the impregnation composition into the accessible pores of the composite material. Drying followed by preliminary heat treatment (step 20) are then performed in order to limit the access of oxygen in the air to the surface of the pores by virtue of the internal protection provided by metallic phosphate.

The preliminary heat treatment is performed by raising the temperature to a temperature lying in the range 200° C. to 740° C., e.g. in the range 650° C. to 740° C., e.g. about 700° C. This temperature may be imposed for one to several hours.

The preliminary heat treatment may be performed under a non-oxidizing atmosphere, e.g. under nitrogen ($N_2$).

Thereafter, the first and second surface coatings are formed on the composite material part. The way these coatings are formed is described below.

The first coating is initially formed using the first coating composition.

The first coating composition is applied by way of example by means of a brush or by spraying onto the outside surface of the part or onto a portion of that outside surface, in an embodiment at the same locations as the impregnation composition (step 30).

For brake disks made of carbon-based composite material, the application of the impregnation composition and of the first coating composition may be limited to the non-friction portions of the outside surface, the friction annular surface of an end disk in a set of stator and rotor disks or the opposite friction surfaces of disks situated between the end disks then not being impregnated in order to avoid spoiling their tribological properties.

Examples of first coating compositions that are suitable for use in the context of the present invention are described in Document US 2015/0291805.

As mentioned above, the first coating composition comprises:
- a metallic phosphate;
- a powder of an ingredient comprising titanium; and
- a powder of $B_4C$.

The metallic phosphate of the first coating composition may comprise an aluminum phosphate, e.g. aluminum hydrogen phosphate $Al(H_2PO_4)_3$. Such a compound is commercially available in an aqueous solution at 48%-50% by weight. In the same manner as above, it is possible to use a phosphate of zinc, of manganese, or of magnesium as the metallic phosphate of the first coating composition.

The ingredient comprising titanium may be selected from: titanium metal (Ti); titanium diboride ($TiB_2$); titanium carbide (TiC); titanium dioxide ($TiO_2$); and mixtures thereof.

In particular, the first coating composition may comprise a titanium metal powder and/or a titanium diboride powder. In particular, the ingredient comprising titanium may be titanium metal.

The powder of the ingredient comprising titanium may be in the form of particles having a mean size less than or equal to 150 micrometers (µm). Unless specified to the contrary, the term "mean size" is used to mean the dimension given by the half-population statistical particle size distribution, written D50.

The boron carbide $B_4C$ powder may be in the form of particles having a mean size less than or equal to 30 µm, e.g. less than or equal to 7.5 µm.

In addition, the first coating composition may include an organic dispersing agent. The organic dispersing agent serves beneficially to further improve the adhesion of the first coating on the underlying part.

The organic dispersing agent may be an organic dispersing agent that is soluble in water and non-ionic, of the oxyethylene fatty acid, oxyethylene fatty alcohol, oxyethylene alkyl-phenol, or higher ester polyol type. The organic dispersing agent may be also be an akcoxyl acetylene polyol, e.g. as sold under the name "Surfynol®" by the US supplier Evonik. It is also possible for the organic dispersing agent used to be constituted by products sold under the names "Levenol®" by the supplier KAO Corporation, or "Marlophen NP9" by the supplier Sasol GmbH.

Furthermore, the first coating composition may include a refractory filler. The refractory filler may be present in the first coating composition, prior to application, at a content by weight that is less than or equal to 5%.

The refractory filler may include one or more refractory oxides, nitrides, or carbides (other than $B_4C$). The refractory filler may comprise one or more ceramic compounds. The refractory filler may be in the form of particles having a mean size less than or equal to 150 µm.

In an example, the first coating composition, prior to application, may comprise:
the metallic phosphate at a content by weight lying in the range 27% to 36%;
the powder of $B_4C$ at a content by weight lying in the range 11.5% to 21%;
the powder of the ingredient comprising titanium at a content by weight lying in the range 8% to 18%;
the organic dispersing agent, such as an akcoxyl acetylene polyol, at a content by weight lying in the range 0.1% to 1.5%;
water at a content by weight lying in the range 33% to 50%; and
optionally the refractory filler at a content by weight less than or equal to 5%.

In an example, the first coating composition, prior to application, may be constituted essentially, i.e. at least 90% by weight, by at least one metallic phosphate, a titanium metal powder, a boron carbide $B_4C$ powder, an organic dispersing agent, and water.

Once the first coating composition has been applied, first heat treatment is then performed in order to obtain the first coating (step 40). During the first heat treatment, a first treatment temperature is imposed.

During the first heat treatment, the first treatment temperature may be high enough to obtain within the first coating an association between at least one crystalline metallic phosphate phase and at least one amorphous metallic phosphate phase. The first treatment temperature may remain low enough to avoid crystallizing all of the metallic phosphate, and consequently to conserve an amorphous metallic phosphate phase in the resulting first coating.

The proportion of metallic phosphate in amorphous form obtained in the first coating may depend on the first treatment temperature and on the duration for which it is applied. For example, increasing the duration of application of the first treatment temperature may lead to lowering the proportion of metallic phosphate in amorphous form in the first coating.

The resulting first coating may be such that the ratio of [the weight of metallic phosphate in amorphous form in the first coating] divided by [the sum of the weight of metallic phosphate in amorphous form in the first coating plus the weight of metallic phosphate in crystalline form in the first coating] is greater than or equal to 0.1, e.g. greater than or equal to 0.2. In particular, this ratio may lie in the range 0.1 to 0.7, e.g. in the range 0.2 to 0.5.

The crystalline and amorphous phases of metallic phosphate may be detected by (1D and 2D) nuclear magnetic resonance (NMR) spectroscopy of the solid cores such as 31P and 27Al.

The first treatment temperature may lie in the range 330° C. to 740° C., e.g. in the range 650° C. to 740° C. Such temperature values serve in particular to obtain a first coating comprising a first phase in which the metallic phosphate is in crystalline form and a second phase in which the metallic phosphate is in amorphous form.

During the first heat treatment, the first treatment temperature may be imposed for a duration greater than or equal to 1 hour (h), e.g. lying in the range 1 h to 15 h. The first heat treatment may be performed under an oxidizing atmosphere, e.g. under air. In a variant, the first heat treatment may be performed under an inert atmosphere, e.g. under nitrogen.

The quantity of first coating composition that is applied may be selected to obtain a first coating that has thickness lying in the range 40 µm to 80 µm. Typically, the quantity of first coating composition that is applied, as measured prior to the first heat treatment, may lie in the range 16 milligrams per square centimeter ($mg/cm^2$) to 23 $mg/cm^2$.

The description above relates to forming the first coating on the surface of the composite material part. A second coating is then made on the first coating.

The second coating is made from the second coating composition, as described below.

The second coating composition is applied by way of example using a brush or by spraying onto the previously formed first coating (step 50). The second coating composition is applied in contact with the first coating.

Examples of second coating compositions suitable for use in the context of the present invention are described in Document US 2007/0026153.

As mentioned above, the second coating composition comprises:
an aqueous suspension of colloidal silica;
a powder of borosilicate glass; and
a powder of $TiB_2$.

The borosilicate glass and $TiB_2$ powders are dispersed in the aqueous suspension of colloidal silica.

The mean particle size of the silica in suspension is less than or equal to 200 nanometers (nm), e.g. lying in the range 5 nm to 100 nm, e.g. in the range 5 nm to 40 nm.

The borosilicate glass comprises silica and a boron oxide $B_2O_3$. The sum of the content by weight of silica plus the content by weight of boron oxide $B_2O_3$ in the borosilicate glass may be greater than or equal to 80%, e.g. greater than or equal to 90%.

As an example of a borosilicate glass, it is possible to use a powder of "Pyrex®" glass, from the US supplier Corning or provided by the British supplier Barloword Scientific (previously Bibby Sterilin), which glass has substantially the following composition (percentages by weight):
$SiO_2$: 80.60%;
$B_2O_3$: 12.60%;
$Na_2O_3$: 4.2%;
$Al_2O_3$: 2.25%;
Cl: 0.1%;
CaO: 0.1%;
MgO: 0.05%%;
$Fe_2O_3$: 0.05%.

Other glasses can be used, such as borosilicate glasses of reference 823-01 to -05 from the US supplier Ferro, or glasses sold by the German supplier Schott AG under the name "Duran" (e.g. under the reference "8330"), "Suprax", or "Borofloat 40".

The aqueous suspension of colloidal silica may be basic. This basic nature may be imparted by an additive, beneficially a stabilizer for the colloidal suspension such as ammonia $NH_3$ or sodium oxide $Na_2O$;

The second coating composition, prior to application, may comprise:
- the aqueous suspension of colloidal silica at a content by weight lying in the range 25% to 50%, with a content by weight of silica in that suspension lying in the range 20% to 50%;
- the powder of borosilicate glass at a content by weight lying in the range 5% to 20%;
- the powder of $TiB_2$ at a content by weight lying in the range 30% to 60%; and
- the balance, if any, being water.

In particular, the aqueous suspension of colloidal silica may be present in the second coating composition prior to application at a content by weight lying in the range 30% to 40%.

In particular, the powder of borosilicate glass may be present in the second coating composition prior to application at a content by weight lying in the range 10% to 15%.

In particular, the powder of $TiB_2$ may be present in the second coating composition prior to application at a content by weight lying in the range 35% to 50%.

Once the second coating composition has been applied, second heat treatment is then performed in order to obtain the second coating on the first coating (step 60). The resulting second coating is in contact with the first coating. During the second heat treatment, a second treatment temperature is imposed.

The second treatment temperature imposed during the second heat treatment may lie in the range 600° C. to 800° C., e.g. in the range 650° C., to 740° C.

During the second heat treatment, the second treatment temperature may be imposed for a duration greater than or equal to 3 h, e.g. lying in the range 3 h to 4 h. In a variant, the second treatment temperature may be imposed for a duration less than or equal to 10 minutes (min), e.g. lying in the range 1 min to 10 min.

The second heat treatment may be performed under an inert atmosphere, e.g. under nitrogen.

The quantity of second coating composition that is applied may be selected so as to obtain a second coating having thickness lying in the range 30 µm to 70 µm. Typically, the quantity of second coating composition that is applied, and as measured prior to the second heat treatment, lies in the range 14 mg/cm² to 21 mg/cm².

Example

Tests have been carried out by the inventors in order to demonstrate the benefit imparted by the invention in terms of protection against oxidation.

During those tests, use was made of parts made of C/C composite material of density lying in the range 1.65 grams per cubic centimeter (g/cm³) to 1.9 g/cm³, approximately, and having a residual pore volume lying in the range 6% to 18% approximately. Those parts were provided with various different protections against oxidation.

In the tests below, application of all of the oxidation protections was preceded by the following preliminary steps:

- impregnation with an aqueous solution of "Marlophen NP 9" or of Levenol C201-B, followed by drying;
- application of an aqueous solution of monoaluminum phosphate at 50% by weight of water using a brush or by robotic spraying (i.e. using a spray gun); and
- heat treatment under an atmosphere of nitrogen ($N_2$) by progressively raising temperature up to 700° C. and maintaining that temperature for a minimum of 1 h.

In order to evaluate the anti-oxidation performance of the protections tested, various oxidation protocols were used, as set out below:

P650+: exposure to 650° C. in air for 4 h, repeated six times and returning to ambient temperature after each exposure, followed by soaking in water for 24 h at 20° C., and then exposure to 650° C. in air for 16 h;

P850+: exposure to 850° C. in air for 30 min, repeated six times returning to ambient temperature after each exposure, then soaking in water for 24 h at 20° C., followed by exposure to 850° C. in air for 3 h;

P1200+: exposure to 650° C. in air for 4 h, return to ambient temperature, followed by exposure to 1200° C. for 15 min, return to ambient temperature, followed by two exposures at 650° C. for 4 h with an intermediate return to ambient temperature, return to ambient temperature, followed by exposure to 1200° C. for 15 min, return to ambient temperature, followed by exposure to 650° C. for 8 h; and P1400+: exposure to 650° C. in air for 4 h, return to ambient temperature, followed by exposure to 1400° C. for 10 min, return to ambient temperature, followed by two exposures to 650° C. for 4 h with intermediate return to ambient temperature, return to ambient temperature, followed by exposure to 1400° C. for 10 min, return to ambient temperature, followed by exposure to 650° C. for 8 h.

The soaking in water that was performed consisted in the following steps in succession:
- immersion of the coated parts in demineralized water at 20° C. for 24 h; and
- drying of the testpieces at 90° C. for 4 h.

Reference Protection 1 (not the Invention)

A first reference protection ("reference protection 1") was provided by applying on the C/C composite part an aqueous suspension comprising:
- an aqueous solution having 50% by weight of aluminum monophosphate at a content by weight equal to 67%;
- a powder of titanium metal at a content by weight equal to 11%;
- a powder of $B_4C$ at a content by weight equal to 16.3%;
- water at a content by weight equal to 4.7%; and
- 1% of Surfynol®.

The applied composition was subjected to heat treatment at a temperature of 660° C. for a duration of 1 h under an atmosphere of nitrogen, so as to obtain the coating.

A single layer of composition was applied in order to constitute reference protection 1.

The quantities of composition that were deposited for reference protection 1 before and after the heat treatment are set out in Table 1 below for each of the test protocols carried out. The quantities of the composition are given per unit area.

TABLE 1

| Test protocol | Quantity of liquid composition deposited before heat treatment | Quantity of composition deposited after heat treatment |
| --- | --- | --- |
| | Reference protection 1 "●" | |
| P650+ | 22.7 mg/cm$^2$ | 12.25 mg/cm$^2$ |
| P850+ | 17.2 mg/cm$^2$ | 9.3 mg/cm$^2$ |
| P1200+ | 21.7 mg/cm$^2$ | 11.7 mg/cm$^2$ |
| P1400+ | 19.7 mg/cm$^2$ | 10.6 mg/cm$^2$ |

The coatings obtained for reference protection 1 had a thickness of about 60 μm.

Reference Protection 2 (not the Invention)

A second reference protection ("reference protection 2") was provided by applying on a C/C composite part the following composition comprising:
  an aqueous suspension of colloidal silica at a content by weight equal to 38%, the content by weight of silica in the suspension being 30%;
  a powder of "Pyrex®" borosilicate glass at a content by weight equal to 13%; and
  a powder of TiB$_2$ at a content by weight equal to 49%.

The "Pyrex®" glass used was supplied by the US supplier Corning and presented substantially the following compositions (percentages by weight):
  SiO$_2$: 80.60%;
  B$_2$O$_3$: 12.60%;
  Na$_2$O$_3$: 4.2%;
  Al$_2$O$_3$: 2.250;
  Cl: 0.1%;
  CaO: 0.1%;
  MgO: 0.05%%;
  Fe$_2$O$_3$: 0.05%.

The applied composition was subjected to heat treatment at a temperature of 700° C. for a duration of 3 h under an atmosphere of nitrogen in order to obtain the coating.

A single layer of composition was applied in order to constitute reference protection 2.

The quantities of composition deposited for reference protection 2 before and after heat treatment are set out in Table 2 below for each of the test protocols carried out. The quantities of the composition are given per unit area.

TABLE 2

| Test protocol | Quantity of liquid composition deposited before heat treatment | Quantity of composition deposited after heat treatment |
| --- | --- | --- |
| | Reference protection 2 "◆" | |
| P650+ | 20.2 mg/cm$^2$ | 13.5 mg/cm$^2$ |
| P850+ | 18.7 mg/cm$^2$ | 12.5 mg/cm$^2$ |
| P1200+ | 18.7 mg/cm$^2$ | 12.5 mg/cm$^2$ |
| P1400+ | 19.7 mg/cm$^2$ | 13.2 mg/cm$^2$ |

The coatings obtained for reference protection 2 had a thickness of about 60 μm.

Reference Protection 3 (not the Invention)

A third reference protection ("reference protection 3") was prepared by applying on a C/C composite part, an aqueous suspension comprising:
  an aqueous solution at 50% by weight of aluminum monophosphate at a content by weight equal to 67%;
  a powder of titanium metal at a content by weight equal to 11%;
  a powder of B$_4$C at a content by weight equal to 16.3%;
  water at a content by weight equal to 4.7%; and
  1% of Surfynol®.

The first layer of this composition was applied followed by first heat treatment carried out at a temperature of 660° C. for a duration of 1 h under a nitrogen atmosphere.

A second layer of this composition was then applied onto the resulting coating. Thereafter, second heat treatment was carried out at a temperature of 660° C. for a duration of 1 h under an atmosphere of nitrogen.

A two-layer coating was thus obtained using the above-described composition.

The quantities of composition deposited for reference protection 3 are set out in Table 3 below for each of the test protocols carried out. These quantities of composition are given per unit area.

TABLE 3

| Test protocol | Quantity of liquid composition deposited before heat treatment (layer 1) | Quantity of composition deposited after heat treatment (layer 1) | Quantity of liquid composition deposited before heat treatment (layer 2) | Quantity of composition deposited after heat treatment (layer 2) | Composition of total coating |
| --- | --- | --- | --- | --- | --- |
| | Reference protection 3 "■" | | | | |
| P650+ | 16.7 mg/cm$^2$ | 9 mg/cm$^2$ | 17.2 mg/cm$^2$ | 11.5 mg/cm$^2$ | 20.5 mg/cm$^2$ |
| P850+ | 18.7 mg/cm$^2$ | 10 mg/cm$^2$ | 17.7 mg/cm$^2$ | 11.8 mg/cm$^2$ | 21.8 mg/cm$^2$ |
| P1200+ | 18.2 mg/cm$^2$ | 9.8 mg/cm$^2$ | 18.7 mg/cm$^2$ | 12.5 mg/cm$^2$ | 22.3 mg/cm$^2$ |
| P1400+ | 19.2 mg/cm$^2$ | 10.5 mg/cm$^2$ | 17.7 mg/cm$^2$ | 11.8 mg/cm$^2$ | 22.3 mg/cm$^2$ |

The coatings obtained for reference protection 3 at had thickness of about 100 μm.

Protection of the Invention

An example protection of the invention ("protection of the invention") was prepared by applying on a C/C composite part a first coating composition in the form of an aqueous suspension, the first coating composition comprising:
- an aqueous solution at 50% by weight of aluminum monophosphate at a content by weight equal to 67%;
- a powder of titanium metal at a content by weight equal to 11%;
- a powder of $B_4C$ at a content by weight equal to 16.3%;
- water at a content by weight equal to 4.7%; and
- 1% of Surfynol®.

A first layer of this first coating composition was applied followed by first heat treatment carried out at a temperature at 660° C. for a duration of 1 h under an atmosphere of nitrogen. A first coating was thus obtained.

Thereafter, there was applied on the resulting first coating a second coating composition comprising:
- an aqueous solution of colloidal silica at a content by weight equal to 38%, the content by weight of silica in the suspension being 30%;
- a "Pyrex®" borosilicate glass powder at a content by weight equal to 13%; and
- a $TiB_2$ powder at a content by weight equal to 49%.

Second heat treatment was then carried out at a temperature of 700° C. for a duration of 3 h under an inert atmosphere. A second coating was thus obtained on the first coating.

The quantities of composition deposited for the protection of the invention are set out in Table 4 below for each of the test protocols carried out. The quantities of composition are given per unit area.

TABLE 4

| | Protection according to the invention "▲" | | | | |
|---|---|---|---|---|---|
| Test protocol | Quantity of liquid composition deposited before heat treatment (layer 1) | Quantity of composition deposited after heat treatment (layer 1) | Quantity of liquid composition deposited before heat treatment (layer 2) | Quantity of composition deposited after heat treatment (layer 2) | Composition of total coating |
| P650+ | 15.3 mg/cm² | 8.2 mg/cm² | 15.8 mg/cm² | 10.6 mg/cm² | 18.8 mg/cm² |
| P850+ | 17.2 mg/cm² | 9.3 mg/cm² | 20.2 mg/cm² | 13.5 mg/cm² | 22.8 mg/cm² |
| P1200+ | 17.7 mg/cm² | 9.5 mg/cm² | 17.2 mg/cm² | 11.5 mg/cm² | 21 mg/cm² |
| P1400+ | 16.7 mg/cm² | 9 mg/cm² | 20.2 mg/cm² | 13.5 mg/cm² | 22.5 mg/cm² |

The coatings obtained for the protection of the invention had a thickness of about 100 μm.

The test results obtained for the various oxidation protocols are given in FIGS. 2 to 5. In each of these figures:
- the reference protection 1 is marked by the "●" points;
- the reference protection 2 is marked by the "♦" points;
- the reference protection 3 is marked by the "■" points; and
- the protection of the invention is marked by the "▲" points.

The results of the P650+ and P850+ tests (FIGS. 2 and 3) show that the weight loss is much smaller for the protection of the invention compared with the reference protections 1 to 3. These tests show that the protection of the invention provide better protection against oxidation in a wet medium compared with the reference protections 1 to 3.

The results of the P1200+ and P1400+ tests (FIGS. 4 and 5) show that the weight loss is much smaller for the protection of the invention compared with the reference protections 1 to 3. These tests show that embodiments of the invention provides better protection against oxidation at very high temperature compared with the reference protections 1 to 3.

The inventors have also observed that a reference protection 4 consisting in two superposed layers of reference protection 2 does not serve to improve the anti-oxidation protection insofar as such a solution leads to a two-layer coating having limited adhesion.

An adhesion problem was also encountered during tests for a reference protection 5 consisting in a two-layer coating that was "inverted" relative to the protection of the invention. This reference protection 5 was thus formed firstly by applying the second above-described coating composition, followed by applying the first above-described coating composition.

By selecting specifically to combine the first coating composition and the second coating composition in the order specified in the invention, a coating is obtained that is of increased thickness, that presents good adhesion, and that presents excellent resistance to oxidation in a wet medium and at very high temperature. This resistance to oxidation is in particular significantly better than that presented by a coating also having increased thickness but presenting a different composition in which two layers of the first coating composition were applied in succession (reference protection 3 marked by the "■" points in FIGS. 2 to 5). The specific combination of the first and second coating compositions of the invention thus provides anti-oxidation performance that is particularly effective in a wet medium and at high temperature.

The term "lying in the range . . . to . . . " should be understood as including the bounds.

The invention claimed is:

1. A method of protecting a carbon-containing composite material part against oxidation, the method comprising:
applying a first coating composition in the form of an aqueous suspension on an outside surface of the part, the first coating composition comprising:
a metallic phosphate;
a powder of an ingredient comprising titanium; and
a powder of $B_4C$;
subjecting the applied first coating composition to a first heat treatment in order to obtain a first coating on the outside surface of the part;
applying a second coating composition on the first coating composition, the second coating composition comprising:

an aqueous suspension of colloidal silica;
a powder of borosilicate glass; and
a powder of $TiB_2$; and
subjecting the applied second coating composition to a second heat treatment in order to obtain a second coating on the first coating,
wherein the first coating obtained on the outside surface of the part has a thickness from 40 µm to 80 µm.

2. The method according to claim 1, wherein the ingredient comprising titanium is titanium metal.

3. The method according to claim 1, wherein the metallic phosphate is an aluminum phosphate.

4. The method according to claim 1, wherein the first coating composition prior to application comprises:
the metallic phosphate at a content by weight lying in the range 27% to 36%;
the powder of the ingredient comprising titanium at a content by weight lying in the range 8% to 18%; and
the powder of $B_4C$ at a content by weight lying in the range 11.5% to 21%.

5. The method according to claim 1, wherein a first heat treatment temperature lying in the range 330° C. to 740° C. is imposed during the first heat treatment.

6. The method according to claim 1, wherein the aqueous suspension of colloidal silica is basic.

7. The method according to claim 1, wherein the second coating composition, prior to application, comprises:
the aqueous suspension of colloidal silica at a content by weight lying in the range 25% to 50%, with a content by weight of silica in the suspension lying in the range 20% to 50%;
the powder of borosilicate glass at a content by weight lying in the range 5% to 20%; and
the powder of $TiB_2$ at a content by weight lying in the range 30% to 60%.

8. The method according to claim 1, wherein a second heat treatment temperature lying in the range 600° C. to 800° C. is imposed during the second heat treatment.

9. The method according to claim 1, wherein at least one internal protection layer is formed prior to applying the first coating composition by impregnating at least a portion of the composite material part with an impregnation composition comprising a metallic phosphate.

10. The method according to claim 1, wherein the part is a friction part.

* * * * *